UNITED STATES PATENT OFFICE.

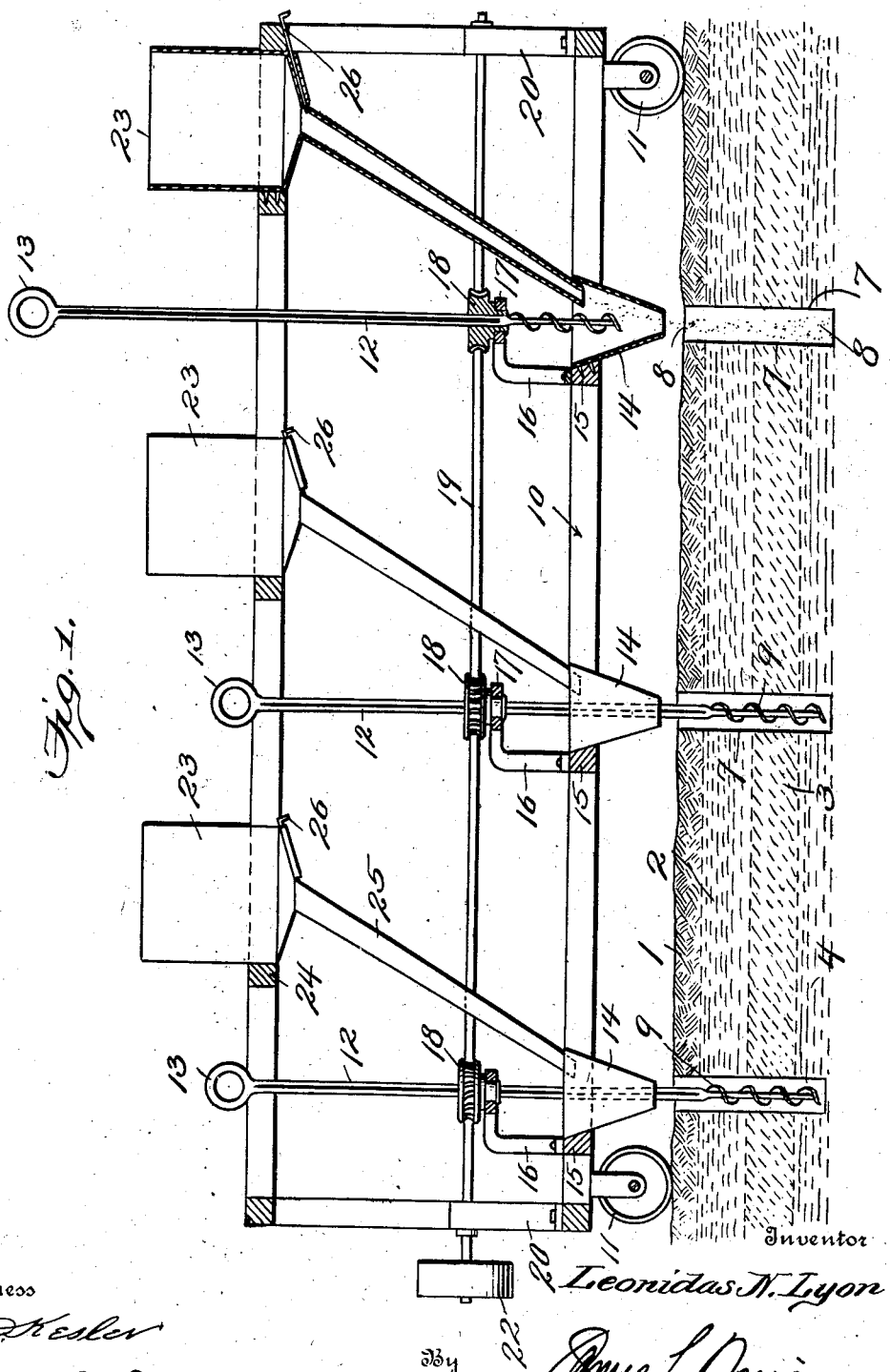

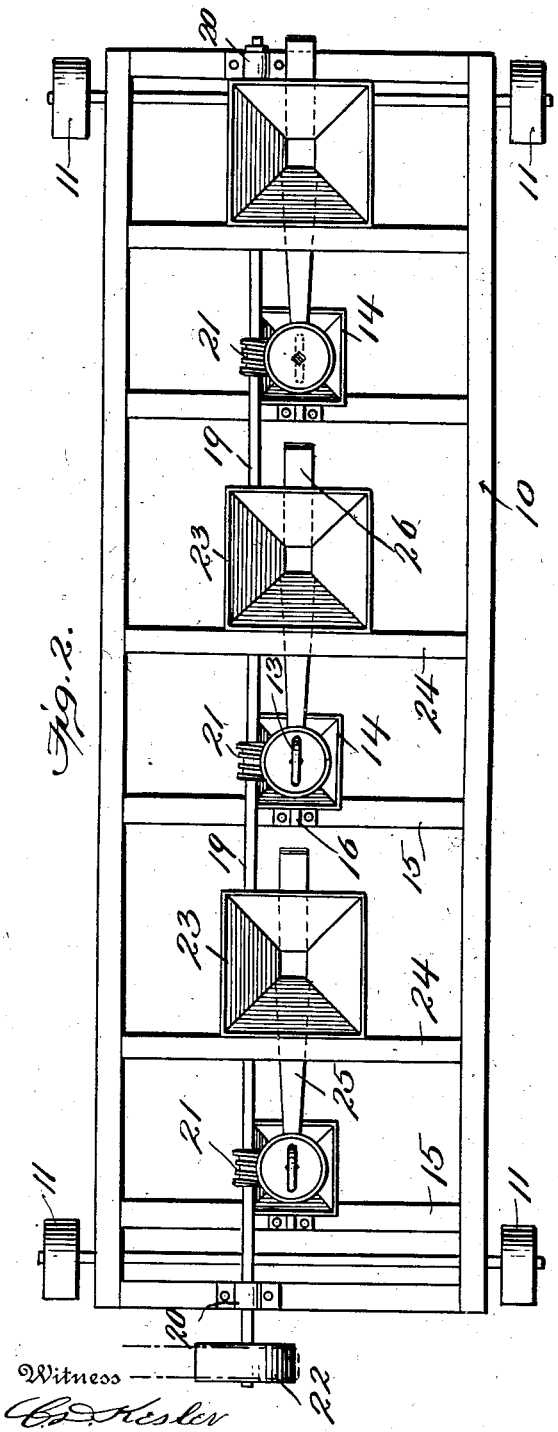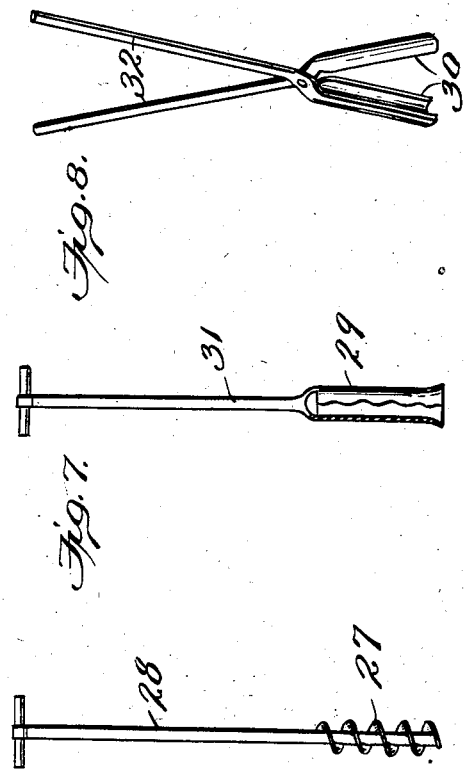

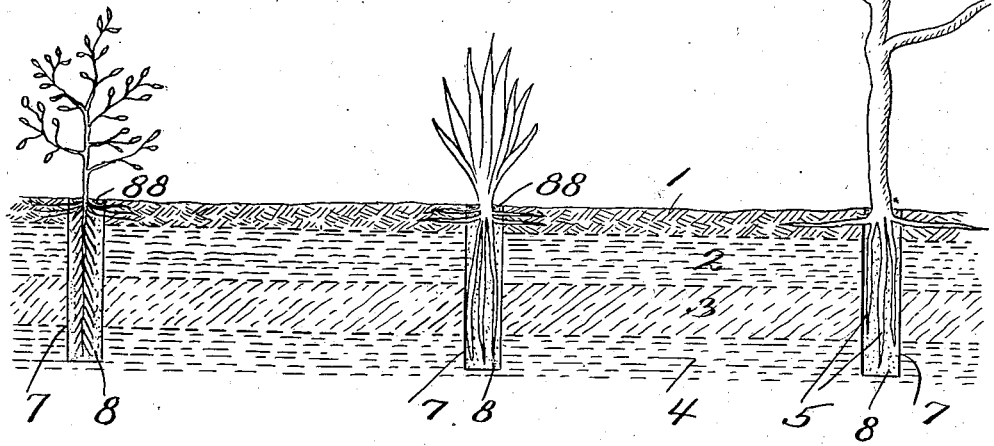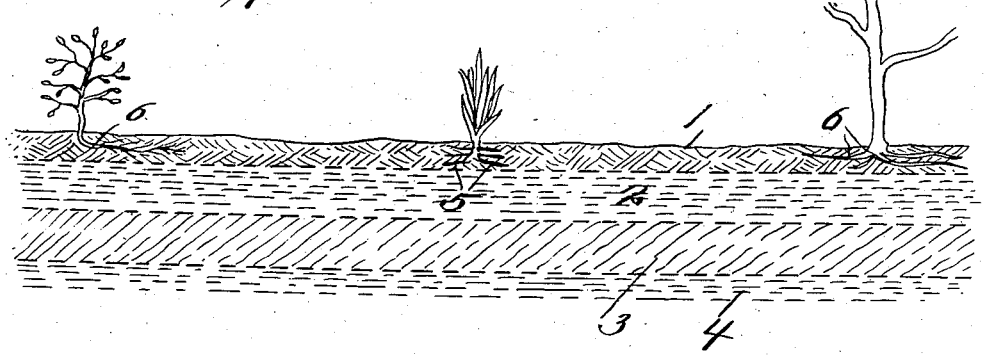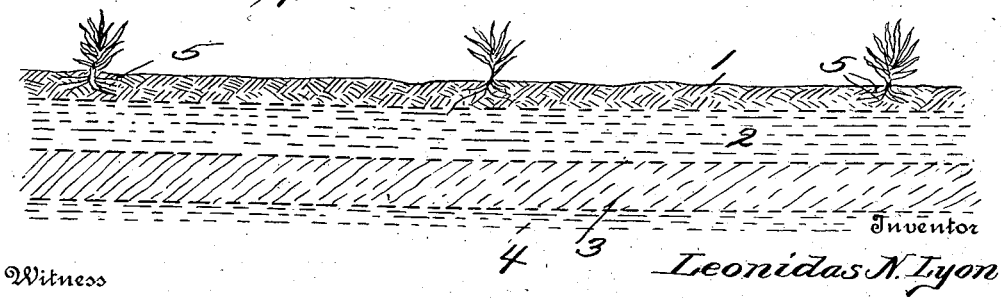

LEONIDAS N. LYON, OF FLATONIA, TEXAS.

CULTIVATION OF SOIL.

1,306,547.  Specification of Letters Patent.  Patented June 10, 1919.

Application filed August 6, 1917. Serial No. 184,680.

*To all whom it may concern:*

Be it known that I, LEONIDAS N. LYON, a citizen of the United States, residing at Flatonia, in the county of Fayette and State of Texas, have invented new and useful Improvements in the Cultivation of Soil, of which the following is a specification.

The present invention relates to conserving and preserving moisture in the soil for growing vegetation.

As is generally understood, the primary and essential element in the growth of a plant is a supply of moisture capable of being drawn upon by the plant as needed. In consequence, the roots of growing plants, especially in the case of plants having what are termed tap-roots, have the tendency to follow a downward direction toward a water supply; but if the plants happen to be situated in soil which is more or less impervious to water, and through which it is difficult for water to percolate, so that the water necessarily drains off, then the roots, on reaching the impervious material, are stopped thereby, and thereafter tend to grow in a plane parallel to the upper layer of such material, since they can no longer continue their natural line of growth. The influence on the plants is of course considerable, since the moisture supply is rendered most uncertain.

I propose, however, to conserve the rainfall by displacing portions of the layers of impervious material and replacing them with a material which will hold water or moisture well. The plant is thus enabled to send down its roots to this specially-prepared supply of moisture and to utilize it as required.

To facilitate a complete understanding of the invention, reference will be made to the accompanying drawings, wherein:

Figure 1 is a part-sectional side elevation of a digging machine for carrying out the method outlined above.

Fig. 2 is a plan view thereof.

Figs. 3 and 4 are diagrammatic views, in vertical section for the most part, illustrating the effects of hard, impervious soil upon vegetation in general, and upon plants of the tap-root variety.

Fig. 5 is a diagrammatic sectional view, illustrating the results obtained by following the improved treatment.

Figs. 6, 7 and 8 show various types of hand diggers.

In Figs. 3 and 4 of said drawing, there are shown, as just stated, soils which are impractical, for crop-growing, under ordinary conditions, because of the fact that, with the exception of the top surface or top-soil, they are composed of layers of material which are impervious to water, 1 designating the topsoil or ordinary soil, which is only a few inches thick, and 2, 3 and 4 the succeeding impervious layers. The plants represented in Fig. 3, have their roots 5 spread out in different directions through the top-soil 1, the nature of the succeeding layers being such that the water cannot percolate therethrough but, instead, drains off and thereby causes the spreading-out action referred to. This action is greatly increased in the case of plants, bushes or trees having a tap-root, as indicated at 6 in Fig. 4, for in such instance, the tap-root grows through the topsoil in a plane substantially parallel with the upper layer 2, instead of growing straight downward as it normally tends to do.

To rectify this, I propose to locate the roots of the plants or the like in holes 7, (Fig. 5), which are dug to the desired depth and which penetrate through the top-soil and through the uppermost impervious layers. Any suitable mechanism or device may be utilized for digging the holes, the material displaced in the formation of the holes being removed either by the digging instrument itself during the digging operation, or afterward by hand, in some suitable way. The holes are then filled with a material 8, such as sand, which has a high capillary action for water, or, in other words, will hold water or moisture well, and after having been filled to the required extent in this manner, they may be covered with a top dressing 88 of fertile soil or of soil charged with plant food, the soil acting to prevent excessive evaporation. Then, when it rains, the water sinks down and saturates the bed of absorbent material before draining off the ground, so that a certain amount is conserved for the plants, which latter, as will be understood, are set directly in the fertilized soil at the tops of the holes and are thereby enabled to send down their roots into the bed of material in the holes and to draw upon the moisture therein contained.

The holes 7, may be dug either by hand, or with the aid of suitable machinery, the latter method being preferred. Figs. 1 and 2 show a machine which has been specially designed for this work and which carries a plurality of cutting implements 9. The machine may advantageously comprise a frame or body 10, provided with end wheels 10, which enable it to be drawn along the field to be cultivated with the aid of an engine or other tractor to which it may be attached. In the embodiment illustrated, three cutters are carried by the machine, each in the form of an auger, which is provided upon the lower end of a vertical rod 12 that terminates at its upper end in an eye 13. These cutters extend upwardly through a series of open-ended funnels or chutes 14, one for each cutter, which are mounted in the bottom of the frame and are fastened to cross-beams 15. The latter also form supports for a set of angular guide brackets 16, whose horizontal arms are provided with terminal bearing eyes 17, wherein a series of worm gears 18 rest and are revolubly mounted. The cutter rods 12 have a sliding fit in the openings in the centers of the gears, which are shaped to conform to the cross-sectional shape of the rods, so that the said rods may be moved vertically in either direction through said gears, but must rotate when the gears are rotated. All of the gears are operated simultaneously, so that it is possible to dig three holes at the same time, provided that all three cutters have previously been moved far enough downward to engage their points in the ground. To effect the rotation of the gears, there is preferably employed a horizontal drive shaft 19, which is journaled in bearings 20 mounted at the ends of the frame and carries a series of worms 21, one meshing with each worm gear. The shaft projects at one end beyond the frame, and has fixed to it a belt pulley 22, for connection with a suitable source of power.

It will be apparent from the foregoing, that the rotation of the drive shaft 19 will be transmitted through the gears 21 and 18 to the cutter rods, all of which will be rotated simultaneously. These rods, as will be understood, are raised and lowered manually by means of their handles or eyes 13, so that if any or all of them have been lowered sufficiently far to penetrate the ground, the rotary movement thus imparted to them will serve to feed them further downward to bore the holes. This operation is continued until the holes have been sunk to the proper depth, whereupon the rotation of the drive shaft is stopped and the cutters are then raised by hand. The soil displaced by the cutting screws, while at work, is automatically discharged thereby from the holes as the boring progresses, so that by the time that the holes have been completed, they are ready to receive the filling of sand or other moisture-absorbing material 8. This material is preferably carried by the machine, so that it can be delivered to the holes as soon as the latter have been sunk and the cutters withdrawn. In the present instance, a hopper 23 is provided for each cutter, and is fastened at one side thereof to a cross-beam 24 in the upper part of the frame. A spout 25 leads downward from each hopper and discharges into the associated chute 14, the latter delivering the material into the previously-dug hole, which it directly overhangs. The passage of the sand or other material through the spout is controlled by a gate or other valve 26, said valve being here shown as arranged against the bottom of the hopper in position to extend across the mouth of the chute. After the holes have been filled, they are covered over with the top dressing 88 of rich or fertilized earth, or the latter may, if desired be applied after the plants have been set in place.

While the digging of the holes is preferably effected by the above-described mechanism, it may be accomplished by means of hand-operated implements, which may be of the types shown in Figs. 6, 7 and 8, or of any other suitable or desired character. In Fig. 6, the cutter 27 has the form of a screw or auger, which is provided upon one end of a rod-like handle 28; whereas, in Figs. 7 and 8, hollow, cylindrical cutters 29 and 30 are represented, the cutter in Fig. 7 having an operating handle 31 which is similar to that shown in Fig. 6, while the cutter in Fig. 8 is made in two parts which are opened and closed scissors-fashion by pivoted handles 32. Still other shapes and forms of cutters may be adopted, both for the automatic and for the hand devices, and the holes may be dug or sunk in other ways than those described, the procedure being the same in all cases after the formation of the holes has been completed. It should be understood that I do not confine myself to any particular form or shape of hole or area of displacement. This may take the form or shape of a round, square or angular hole, or it may take the form and shape of a trench or ditch were all the displaced material removed therefrom.

I claim as my invention:

The herein-described method of conserving and preserving moisture in the soil for growing vegetation which consists in displacing portions of the top soil and portions of only some layers directly below the top soil which are impervious to water to provide water retaining reservoirs extending into said impervious layers and filling said layers to a desired extent with loose plant growing material having a high capillary attraction for water.

In testimony whereof I have hereunto set my hand in presence of two subscribing witnesses.

LEONIDAS N. LYON.

Witnesses:
    D. A. JENNINGS,
    E. STUDEMAN.